United States Patent

Oliveras et al.

[11] Patent Number: 5,867,605
[45] Date of Patent: Feb. 2, 1999

[54] FILTERING METHOD AND CORRESPONDING FILTERING SYSTEM

[75] Inventors: Albert Oliveras, Barcelona; Philippe Salembier, Esplugas-Barcelona; Luis Garrido, Barcelona, all of Spain

[73] Assignee: U.S. Philips Corporation, New York, N.Y.

[21] Appl. No.: 813,415

[22] Filed: Mar. 10, 1997

[30] Foreign Application Priority Data

Mar. 13, 1996 [EP] European Pat. Off. .............. 96400521
Sep. 9, 1996 [EP] European Pat. Off. .............. 96401924
Dec. 31, 1996 [EP] European Pat. Off. .............. 96402925

[51] Int. Cl.$^6$ ........................................... G06K 9/00
[52] U.S. Cl. ............................. 382/260; 382/224
[58] Field of Search ..................... 382/168, 169, 382/170, 171, 172, 173, 190, 224, 225, 226, 227, 228, 230, 232, 233, 234, 237, 254, 260, 261, 262, 263, 264, 274, 275, 282, 283, 305, 309, 238, 239, 236; 348/396, 390, 410, 472; 360/32; 369/59; 386/33, 44

[56] References Cited

U.S. PATENT DOCUMENTS 4,785,344 11/1988 Keith et al. .............................. 358/136
4,918,523 4/1990 Simon et al. ............................ 358/133
5,225,904 7/1993 Golin et al. ............................. 358/133

*Primary Examiner*—Leo H. Boudreau
*Assistant Examiner*—Bijan Tadayon
*Attorney, Agent, or Firm*—Laurie E. Gathman

[57] ABSTRACT

This relates to a filtering method for processing an image sequence, including for each image parallel binarizations of the gray levels, provided to define a tree structure made of a father node ($c_0^1$) corresponding to a background (A0) and of successive child nodes ($C_h^k$) corresponding to associated connected components (B1, D1, F1, C2, E2, G2) and a decision on the elimination or the preservation of each node ($C_h^k$), followed by an assignment of a gray level value to each picture element. This type of filtering offers the advantage of simplifying the images as well as perfectly preserving the contours, and the decision is based on various proposed simplification criteria, among which the motion-oriented one is particularly attractive.

14 Claims, 7 Drawing Sheets

ORIGINAL FRAME
f

A) ORIGINAL FRAME

B) MOTION CONNECTED OPERATOR Ψ (f)

C) DUAL OPERATOR Ψ*(Ψ(f))

D) RESIDUE f−Ψ*(Ψ(f))

B) OBJECTS WITH TRANSLATION (2,0)

C) OBJECTS WITH TRANSLATION (0,0)

D) REMAINING OBJECTS

FILTERING METHOD AND CORRESPONDING FILTERING SYSTEM

The present invention relates to a method of filtering a sequence of images. It also relates to a corresponding filtering system.

In image and video compression techniques, compression is generally achieved by a decorrelation of the signal followed by quantization and entropy coding of the information to transmit. Decorrelation is usually obtained by predictive or transform techniques. For very high compression, there is however an increasing interest in second-generation image compression techniques. These techniques also eliminate the redundant information, but in addition try to take advantage of the properties of the human visual system. In particular, region-based compression methods, described for instance in the article "Object-oriented analysis-synthesis coding of moving images", by H. G. Musmann and al., Signal Processing: Image Communication, vol. 1, n°2, October, 1989, pp. 117–138, describe the images or the sequences in terms of a set of regions, that is, a partition, and of some information for each region to be used by the receiver to reconstruct the image.

In a region-based coding approach, the geometrical characteristics of the signal play an important role. Objects are not only characterized by the correlation of their pixels but also by some geometrical properties. Classical linear signal processing tools are not well suited for a geometrical approach, and other tools coming from nonlinear signal processing or from computer vision may be attractive for this purpose. Mathematical morphology has been developed as a geometrical approach to signal processing, and the use of morphological tools for coding is becoming an active field of research. A particular morphological tool, the connected operators, has recently been defined and have proved to be useful for compression. This class of operators solves the problem of image simplification while preserving the contour information of the non-simplified components. The contour preservation property of connected operators is much better than that of linear, median, rank order, and classical morphological filters. They can be used for a large number of purposes in a coding scheme but they are specially useful for segmentation. An example of application is given for instance in the article "Flat zones filtering, connected operators, and filters by reconstruction", P. Salembier and J. Serra, IEEE Transactions on Image Processing, vol.4, n°8, August, 1995, pp. 1153–1160. These filters are attractive in applications where the signal has to be simplified without loosing information about the contours. Popular examples include as already said segmentation, but also sequence analysis, object recognition, etc.

In order to understand how connected operators work, an example for binary images may be described. As defined in the cited document, a binary connected operator $\psi$ is an operator that, for any binary image denoted X, only removes connected components of X or of its complement $X^C$ (the well known binary opening by reconstruction is an example of such an operator). In the sequel, it is proposed to consider only the case of anti-extensive operators: a binary connected operator is then an operator that can only remove connected components of X.

The filtering method in case of binary images can easily be explained thanks to a tree representation of an image. This approach is illustrated in FIG. 1, showing how a binary connected operator works. An original binary image X is composed of three connected components. It can be represented by a tree structure with four nodes. In this original tree OGT, the root node $C_0^1$ represents the set of pixels belonging to the background $X^c$, and the three nodes $C_1^k$ (k=1, 2, or 3) represent the three connected components of the image. In this representation, the filtering process consists in analyzing each node $C_1^k$ by assessing the value of a particular criterion (analysis step AS). If the criterion consists for example in counting the number of pixels belonging to a node, then the criterion value is compared for each node to a given threshold $\lambda$ and the node is removed if the criterion is lower than $\lambda$. In the example of FIG. 1, the node $C_1^2$ is removed (removed connected component RCC) because its area is small, and its pixels are moved to the background node $C_0^1$ (the corresponding connected component is removed). The output tree OPT comprises now the father node $C_0^1$ and two children nodes $C_1^1$ and $C_1^3$. As can be seen, the tree links represent the pixels' migration (towards the father) when a node is removed. This process leads to a simplification of the output binary image OBI (some connected components have been removed) as well as to a preservation of the contour information of the remaining components (components that are not removed are perfectly preserved), without any creation of new contours. All anti-extensive binary connected operators can be described by this process, the only modification being the criterion that is assessed.

A first object of the invention is then to propose an improved filtering method allowing an application of connected operators to gray-level images.

At this end, the invention relates to a filtering method comprising for each considered image:

(A) a classification step, including parallel binarizations of the image for some of the gray levels of its picture elements, said binarizations being provided for defining a local background and, after an analysis of the background complement, corresponding successive connected components constituting together a tree structure made of a father node and successive child nodes and called a max-tree representation of the concerned image, and being followed by a reconstitution of an approximation of the gray level function of said image;

(B) a filtering step, provided for taking a decision on the elimination or the preservation of the nodes of the tree according to a specified filtering criterion, the picture elements of any eliminated node being assigned to its father node;

(C) an image restitution step, provided for assigning to each picture element of the image a gray level value.

In a advantageous embodiment, said filtering method is characterized in that:

(A) the classification step comprises the following substeps:
  (1) a binarization sub-step, comprising the following operations:
    (a) a definition of the binarization criterion;
    (b) n parallel binarizations of the image, the first one resulting in the definition of the local background and the (n−1) other ones resulting in the definition of the corresponding successive connected components;
    (c) said reconstitution of an approximation of the gray level function of the image;
(B) the filtering step comprises the following sub-steps:
  (3) an analysis sub-step, provided for defining and measuring a filtering criterion;
  (4) a decision sub-step, provided for taking the decision on the elimination or the preservation of the nodes;

(C) the image restitution step comprises the following sub-step:
  (5) a computing sub-step, provided for assigning to each picture element of the image the gray level value of the node it belongs to.

According to a particular characteristic of the method, the binarization operations leading to the definition of the connected components are carried out by the use of a watershed method, including first the computation of a so-called distance function DIST(X) of the binary at X resulting from the previous local background complement definition and then the computation of the watershed of (-DIST(X)).

Moreover, in another embodiment of the filtering method, the classification step also comprises, after said binarization sub-step:
  (2) a correction sub-step, in which the binarization operations leading to the definition of the connected components are carried out by the use of a watershed method, including first the computation of a so-called distance function DIST(X) of a filtered version of the binary set X resulting from the previous background complement definition and then the computation of the watershed of -DIST(X)).

According to a particularly efficient embodiment, for a simple tree involving a single branch, said decision sub-step itself comprises:
  (a) a first assignation operation, provided for assigning to each node $C_h^k$ of the max-tree representation two states $P_h$ and $R_h$ corresponding to the two possible decision "preserve" and "remove";
  (b) a second construction operation, provided for creating a trellis that comprises transitions linking the possible decisions of one node $C_h^k$ and of its father $C_{h-1}^k$, said transitions being called $R_h \to R_{h-1}$, $R_h \to P_{h-1}$, $P_h \to R_{h-1}$ and $P_h \to P_{h-1}$,
  (c) a third cost assignation operation, said cost reflecting the reliability of each decision for each node, and the global cost of a path being defined as the sum of the costs of its transitions;
  (d) a fourth local decision operation, provided for selecting the optimum paths ending at $P_h$ and $R_h$ thanks to a criterion of selection of a rule leading to the determination of a lowest additive cost;
  (e) a fifth global decision operation, provided for defining the definitive decision for each node on the basis of the states associated to the selected optimum path.

According to a variant of said embodiment, for a tree involving several branches, said decision sub-step itself comprises, within each branch:
  (a) a first assignation operation, provided for assigning to each node $C_h^k$ of the max-tree representation two states $P_h$ and $R_h$ corresponding to the two possible decisions "preserve" and "remove";
  (b) a second construction operation, provided for creating a trellis that comprises transitions linking the possible decisions of one node $C_h^k$ and of its father $C_{h-1}^k$, said transitions being called $R_h \to R_{h-1}$, $R_h \to P_{h-1}$, $P_h \to R_{h-1}$ and $P_h \to P_{h-1}$;
  (c) a third cost assignation operation, said cost reflecting the reliability of each decision for each node, and the global cost of a path being defined as the sum of the costs of its transitions;
  (d) a fourth local decision operation, provided for selecting the optimum paths ending at $P_h$ and $R_h$ thanks to a criterion of selection of a rule leading to the determination of a lowest additive cost;

said four operations being followed, after their implementation successively for each branch, by an additional global decision operation, provided for first defining a global optimum path as the union of said respective optimum paths and an associated global cost equal to the sum of the respective costs of these optimum paths, and then defining the definitive decision for each node on the basis of the states associated to the defined global optimum path.

A further object of the invention is to propose a system for carrying out said filtering method.

At this end, the invention relates to a system for filtering a sequence of images, comprising:
  (A) a classification device, itself comprising:
    (1) a max-tree creation stage, said stage including in series:
      (a) a circuit for the definition of a binarization criterion;
      (b) n parallel binarization circuits generating, according to said binarization criterion, simplified versions of the considered original image in the form of a local background and of associated connected components constituting a tree structure made of a father node and successive child nodes and called a max-tree representation of said considered original image;
      (c) a reconstruction circuit generating an approximation of the gray level function of said considered original image;
  (B) a filtering device, itself comprising:
    (3) an analysis stage, provided for analyzing each node of said max-tree according to a specific filtering criterion;
    (4) a decision stage, provided for eliminating or preserving nodes of said max-tree on the basis of said filtering criterion and, each time a node is eliminated, for merging its picture elements with those of its father node;
  (C) an image restitution device, provided for computing the output images by assigning to each of its picture elements the gray level value of the node it belongs to.

In said system, the classification device may comprise, in series with said max-tree creation stage:
  (2) a correction stage, including in series:
    (d) a device for the computation of the function distance of a filtered version of a binary set resulting from a background complement definition;
    (e) a device for the computation of the watershed of the opposite of said function distance.

In a particular embodiment of said filtering system, said specific filtering criterion is a complexity one, said analysis stage then comprising a circuit for measuring for each connected component the ratio between its perimeter and its area and said decision stage comprising means for eliminating the nodes that have a long perimeter and a small area and merging the picture elements of each eliminated node to those of its father node.

In a further embodiment of the system said specific filtering criterion is an entropy one, said analysis stage then comprising a measuring operation, provided for defining, after a computation of the histogram of the pixels belonging to a connected component, the amount of information given by each connected component, and said decision stage then comprising a decision operation, provided for removing all components with entropy lower than a predetermined value.

In another advantageous embodiment of the system, said specific filtering criterion is a motion one, said analysis stage then comprising a circuit for the definition of a motion model giving a displacement field ($D_x(i,j)$, $D_y(i,j)$) for each picture element (i,j) of the considered original image and said decision stage comprising means for eliminating or preserving the nodes according to a parameter related to said motion model.

This type of filtering criterion is indeed particularly advantageous. Generally, motion information is measured without knowing anything about the image structure. By using motion connected operators, a different way of handling motion information is proposed: it becomes possible to analyze image sequences where objects are following a known motion, and then to take appropriate decisions on the basis of this new type of analysis of the structures of the images. As an interesting application of these operators (allowing motion-oriented segmentation of sequences), all kinds of watching tasks (domestic or professional buildings, offices, . . . ) seem to be concerned.

The present invention will be now described in further detail, with reference to the accompanying drawings in which.

Figure 3:
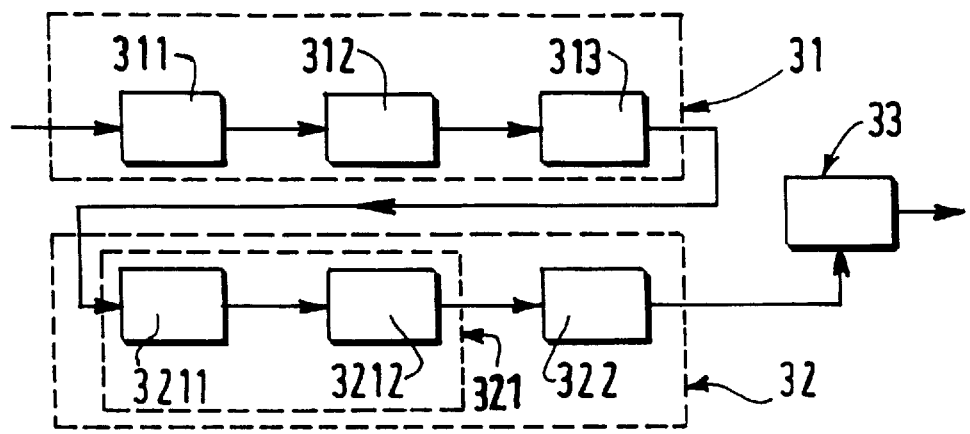
Figure 4:
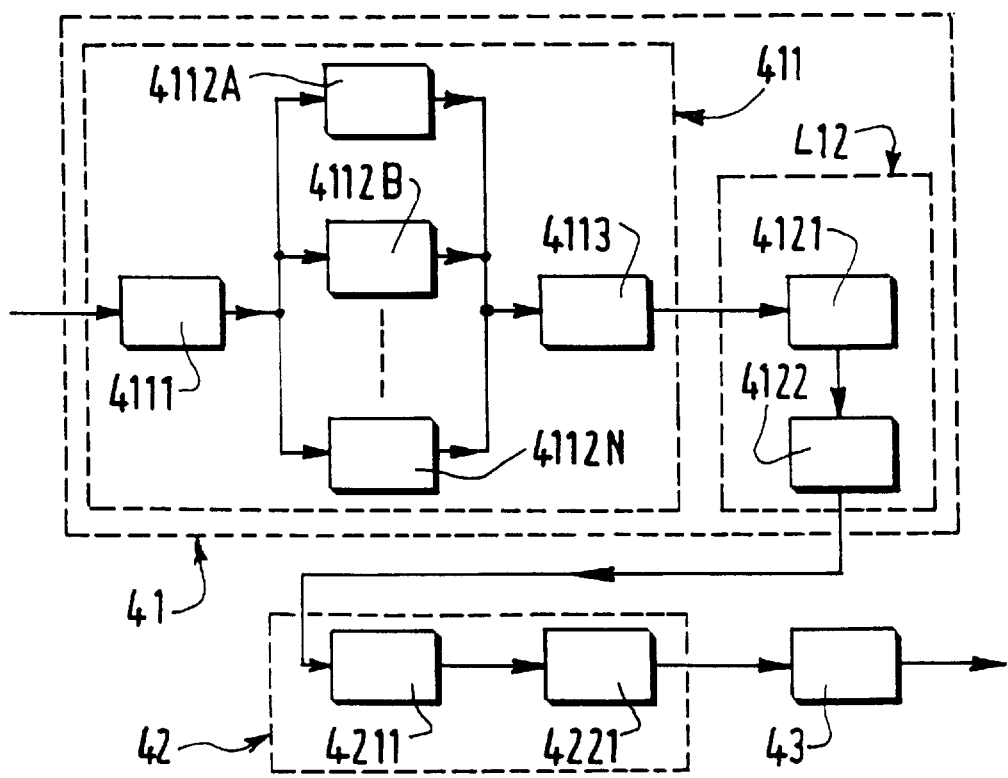
Figure 5:
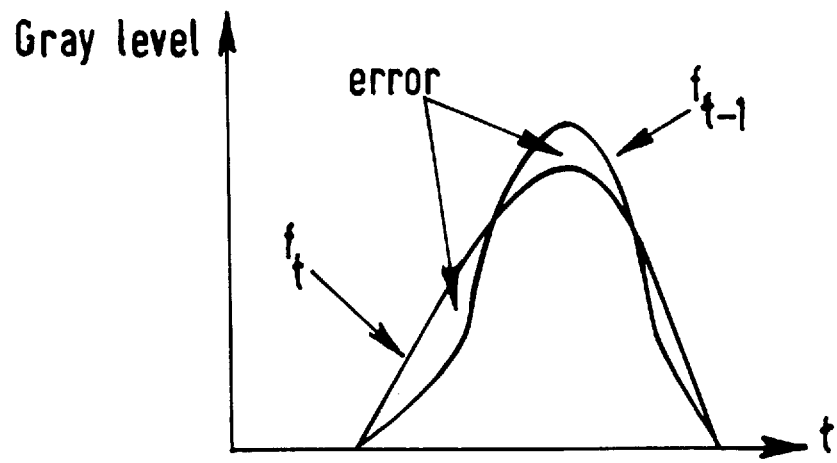
Figure 6:
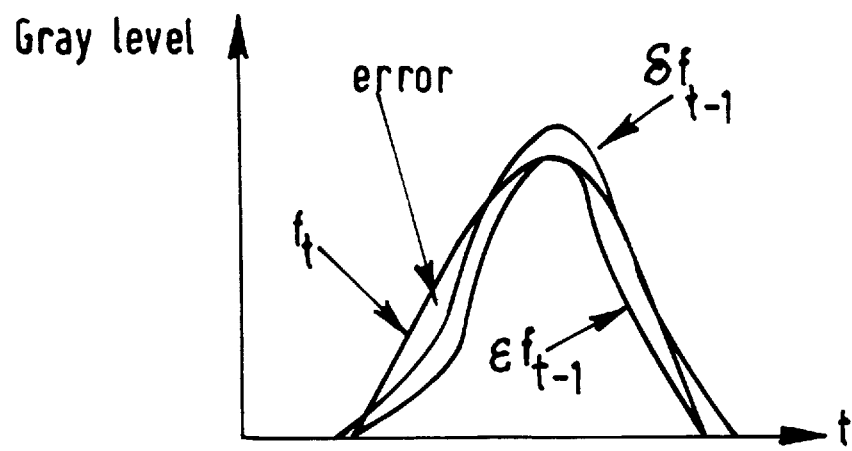
Figure 7:
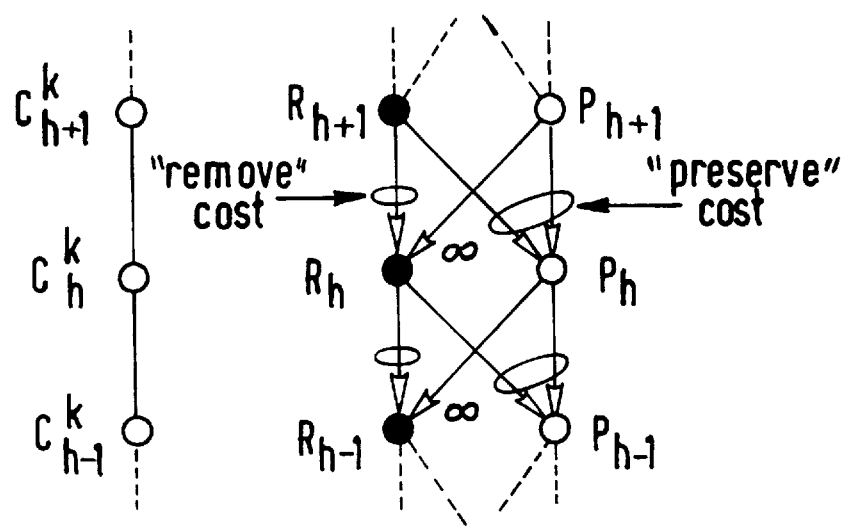
Figure 8:
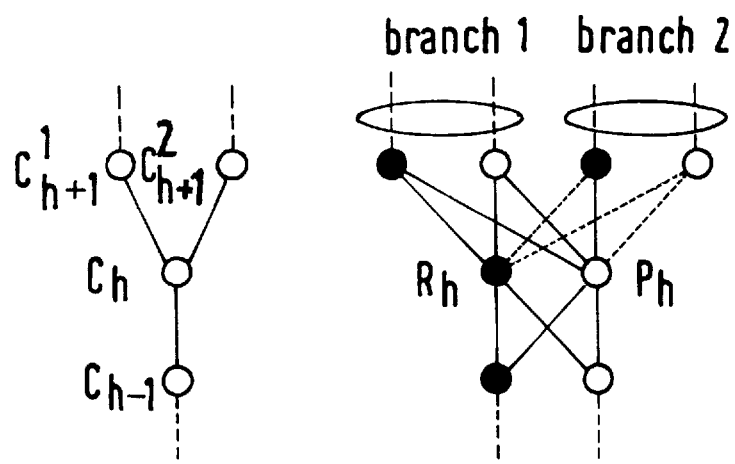
Figure 9:
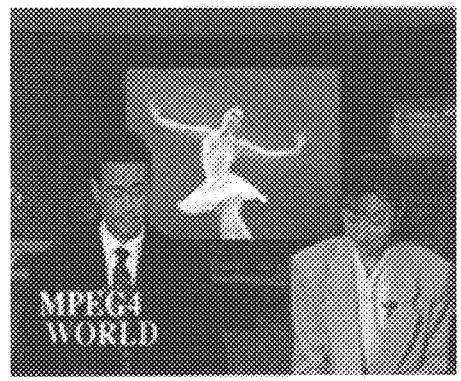

FIGS. 3 and 4 respectively illustrate the general filtering scheme corresponding to the method in accordance with the invention and an example of a filtering system for implementing said method;

FIGS. 5 and 6 illustrate the implementation of the motion criterion for one motion parameter and for a range of motion respectively;

FIGS. 7 and 8 respectively describe, in order to explain some aspects of the decision sub-step, a trellis construction for said decision in the case of a single branch tree structure and in the case of a multiple branches tree structure;

FIGS. 9 to 16 illustrate two motion filtering examples.

Figure 2:
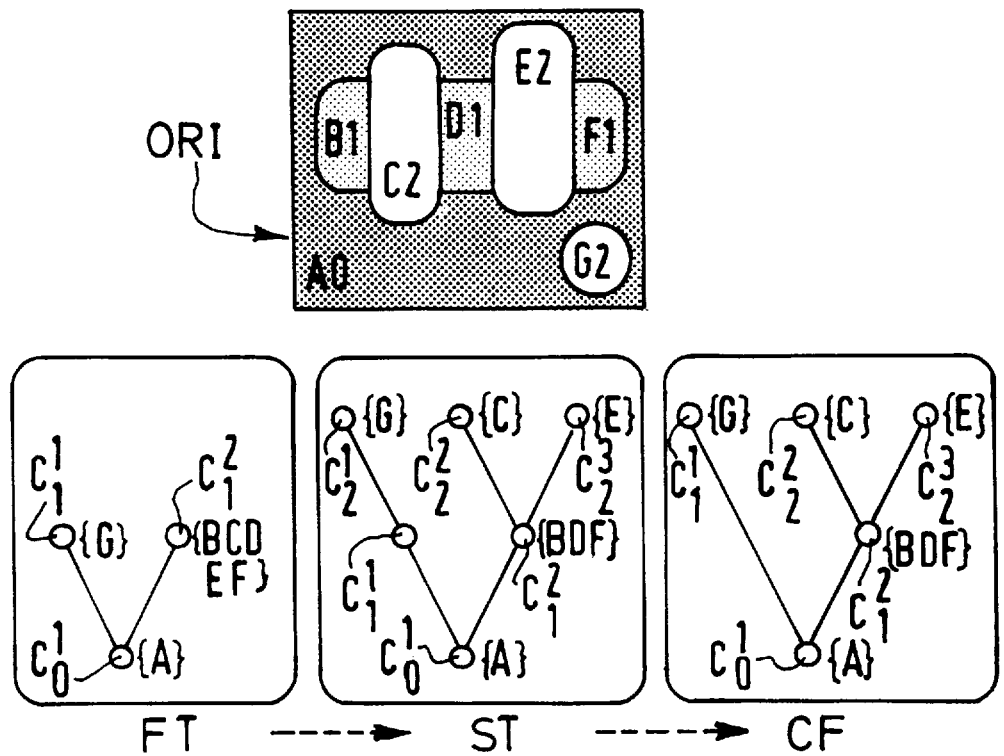
FIG. 2 shows a tree representation in the case of an original image with several gray levels.

The basic principle of the invention is to carry out an improved method for applying a tree representation to the gray level case. The idea consists in creating recursively the tree by a study of thresholded versions of the image at all possible gray levels. An example is presented in FIG. 2. The original image ORI is composed of seven flat zones (largest connected components where the signal is constant) identified by a letter {A, B, C, D, E, F, G}. The number following each letter defines the gray level value of the flat zone. In this example, three gray level values range from 0 to 2.

In order to carry out said basic principle, in a first step, a first threshold is fixed to the gray level value 0. The image is then binarized: all pixels at level h=0, i.e. pixels of region A, are assigned to the root node of the tree, which is noted $C_0^1 = \{A\}$ (and said region A is referenced A0). Furthermore, the pixels of gray level value strictly higher than h=0 form two zones, or two connected components: $C_1^1 = \{G\}$, and $C_1^2 = \{B, C, D, E, F\}$, that are temporarily assigned to two temporary nodes. This creates a first tree FT (for gray levels comprised between 0 and 1), according to a procedure similar to the one used for the binary image. In a second step, the threshold is increased by one (h=1). Each node $C_{h-1}^k$ is processed as the original image. Consider, for instance, the node $C_1^2 = \{B, C, D, E, F\}$. All pixels belonging to this node that are at level h=1 remain assigned to this node. However, pixels of gray level value strictly higher than h (here {E,C}) create two different connected components and are moved to two child nodes $C_2^2 = \{C\}$ and $C_2^3 = \{E\}$, which creates a second modified tree ST. If there are higher gray level values, a complete final tree CFT is obtained by iterating this process for all nodes k at level h and for all possible thresholds h (from 0 to the highest gray level value).

The method can be summarized by saying that, at each node $C_h^k$, a local background is defined by keeping all pixels of gray level value equal to h and that the various connected components formed by the pixels of gray level value higher than h progressively create the child nodes of the tree. Such a procedure can be well understood by means of a comparison of the gray-level image to a topographic surface completely covered by the see. As the level of the see decreases, lakes will appear: at altitude h one has n lakes ($C_h^1$, $C_h^2$, . . . , $C_h^n$), while at the highest altitude the see is unique. The interconnections of all lakes as they evolve when the see level goes down may be represented as a tree. The root of the tree represents the see covering the whole area. As the level goes down one step, the extension of the see may remain unchanged, or some flat zones at the previous altitude get uncovered. Due to these dried areas, the see may become disconnected in one or several connected components. A new node is created for each lake at the new altitude and is connected to the root node representing the see one level above: a single branch will be created in the case where the see remains one connected component and several branches building a fork when there is a disconnection. As the level of the water goes down, the same recursive procedure expanding the tree is applied to each lake $C_h^k$ still present at the current altitude. The leaves of the tree represent the deepest level of the lakes.

In this procedure, some nodes may become empty (i.e. without additional branch). Therefore, at the end of the tree construction, the empty nodes are removed (as for instance $C_1^1$ in the complete final tree CFT of FIG. 2). The complete final tree CFT is called a max-tree in the sense that it is a structured representation of the image, oriented towards the maxima of the image (the maxima are simply the leaves of the tree) and towards the implementation of anti-extensive operators (a min-tree devoted to the implementation of extensive operators should be similarly defined, by duality). The filtering step itself is similar to the one used for the binary case: a criterion is assessed for each node and, based on this value, the node is either preserved or removed. However, in this last case, the node's pixels are moved towards its father's node and, at the end of the process, the output tree CFT, or max-tree, is therefore transformed into a gray level image by assigning to the pixels of each node $C_h^k$ the gray value h.

The general filtering scheme corresponding to the method in accordance with the invention will now be described in a more detailed manner. As can be seen in FIG. 3, said method comprises three main steps: a first pixel classifying step 31, a second filtering step 32, and a third image restitution step 33, carried out in a filtering system as shown in FIG. 4.

The first step 31 allows to structure the pixels of each current image in a suitable way for the filtering process. This suitable way consists of a classification of the pixels, by means of the tree structure previously called max-tree (i.e. a set of nodes $C_h^k$ and the links between the father and children nodes, according to the previously described process). The process is iterative, starting from the lowest gray level value of the image and going up to the highest one. According to a first binarization sub-step 311 and as previously described, for each temporary node $C_h^k$, the set of pixels belonging to a local background is defined and assigned to said node $C_h^k$ of the max-tree. Theoretically the conventional way of defining the local background of any node at a given level value h consists in taking all pixels having said gray level value. Formally a node $C_h^k$ is composed of the pixels (i,j) for which the gray level value f(i,j)=h (for instance the node $C_0^1$ is composed of the pixels (ij) of the image for which f(i,j)=0, and so on). Flat zones of the image are therefore successively extracted.

However, in practice, these basic visual entities, each of which is characterized by a strictly flat gray level value, may be in fact more or less flat because of noise or texture. The binarization process practically carried out will then be different: each local background will be defined according to a less strict criterion, for example according to the following ones:

- a fixed threshold: instead of defining the threshold to be exactly the gray level h of the node, one may use a higher level to include more pixels in the background, so that a node $C_h^k$ is now composed of the pixels (ij) for which (f(i,j)-h) is lower than a fixed threshold TD;
- an adaptive threshold: instead of defining a fixed threshold TD or if the a priori definition of such a fixed threshold is difficult, the definition of a variable threshold based for instance on the histogram of the concerned pixels may be used (for example, pixels of gray level value below the mean value of the pixels are taken).

In fact the useful criterion that has been chosen relies on the definition of a bound $\Delta$ on the gray level fluctuations. The corresponding adapted binarization rule is then the following: the node $C_h^k$ is composed of the pixels (i,j) for which either f(i,j)=h or $|f(i,j)-f(i',j')|\leq\Delta$, i'and j' defining any pixel that is a neighbor of any pixel i,j satisfying f(i,j)=h. That means that, if a flat zone is composed of pixels with low gray level fluctuations, a $\Delta$ parameter is chosen for defining a limit for these fluctuations in each flat zone (the particular case $\Delta=0$ corresponding to the situation when the zones are strictly flat). The interest of this solution can be foreseen by looking at the number of flat zones, that decreases as the value of the bound $\Delta$ increases. If a strict binarization is used (i.e. $\Delta=0$), a region of the concerned image is represented by a very high number of small flat zones and will not be processed as a single visual entity. On the contrary, if a soft binarization is used, these numerous small flat zones are grouped together to form larger entities that will be processed in a coherent way by the connected operator.

It must however be noted that, with such an adapted binarization process, the pixels assigned to a given node of the max-tree have not the same gray level value. During the third image restitution step 33 described later, it will therefore not be possible to simply assign the gray level h to pixels belonging to a node $C_h^k$, and another solution will be proposed for that assignation. At that moment and in the sequel, it is provisionally supposed that a strict binarization process is implemented (i.e. $\Delta=0$).

After the binarization sub-step 311, a connected components definition sub-step 312 takes place. Once a local background (i.e. for instance $C_h^k$) has been defined, its complement has to be analyzed in order to perform the connected components definition, that is to say to create the new nodes at the level (h+1). The proposed approach consists in selecting a given type of connectivity and in labeling the set of pixels of the node that does not belong to the local background following the connectivity rule (this sub-step is very important because it defines the entities— i.e. the nodes of the tree—on which the connected operator will act). In practice, connected operators are known to present a drawback, called leakage, that results from the connections of different objects, created because there exist some thin connected paths between large objects. A solution to this problem, allowing to define a strict connectivity, consists in breaking these thin connections and segmenting the components into a set of elementary shapes that are processed separately (the connected operator can take an individual decision on each elementary shape).

Several methods are known in order to define such a strict connectivity, and the proposed one consists for example in using some morphological tools such as the watershed method described for instance in the european patent application EP-0627693 previously filed by the applicant, more precisely in computing the so-called distance function DIST (X) of the binary set X resulting from the previous local background definition and in computing the watershed of the opposite (-DIST(X)) of this distance function. The watershed transform then associates to the minima of (-DIST(X)) regions called catchment basins (these minima, being the maxima of the distance function, correspond to the ultimate erosions of said set).

If the segmentation driven by the ultimate erosion creates too many connected components, their definitive number can be simply defined by implementing a segmentation of a thresholded version of the distance function, denoted (-DIST (X) $\wedge$l) and in which the parameter l (l=size of the erosion) allows to go progressively from the classical connectivity when l=0 to the extreme case where the number of connected components is defined by the number of ultimate erosions when l takes an infinite value. The final result obtained by this watershed segmentation for l=1 for instance corresponds to a natural size-oriented simplification, and particularly avoids the leakage problem (the unwanted connections created because thin connected paths have appeared between two large objects).

A correction sub-step 313 is then provided since an analysis of this re-segmented picture generally shows the presence of small holes in the connected components. This leads to the fact that the distance function possesses a large number of regions maxima, and a large number of connected components will therefore be created by the segmentation. This drawback can be avoided, at least partially, if the distance function is computed not on the original binary image X but on the result of a closing by reconstruction, denoted $\phi$ (X), or area closing. The effect of this operation is to fill the small holes inside the connected components. As a result, the distance function of $\phi$ (X) is much simpler and involves in particular a reduced number of regions maxima. The segmentation resulting from this distance function now corresponds to a more natural decomposition of the connected components, and an image simplified as described involves no longer false contours.

The second step 32 allows first to analyze each node of the max-tree by measuring a specified filtering criterion and then to take a decision on the elimination or the preservation of the node. These two sub-steps (analysis sub-step 321, decision sub-step 322) will be discussed in a more detailed manner.

In the first analysis sub-step 321, several specific criterions may be used. A first one should be for instance a complexity criterion, that is a purely geometrical one. Other criterions are possible: for instance one dealing with the gray level distribution, or entropy criterion, and one devoted to image sequences, or motion criterion.

In the case of a complexity criterion, the basic idea is to define (operation 3211) an operator which will be able to remove complex connected components, for instance by measuring for each connected component the ratio between its perimeter P and its area A (P/A, or A/P). If a connected component has a small area but a very long perimeter, it is considered as corresponding to a complex object (for instance, the complexity of a circle of area A is $C=(2.\sqrt{\pi})$ $\sqrt{A}$, while C=4 √A for a square having the same area A: the circle is more simple than the square) and can be eliminated (operation 3212). More generally, such an operator removes (in images) parts such as texts or textures, that can generally be considered as complex by comparison with linear shapes or areas without textures, while preserving the contours of the objects that have not been eliminated (in fact, complex and bright objects are removed from the original image, but a dual or alternated operator can also be defined for dealing with the complexity of dark objects: in both cases, the obtained effect is neither size-oriented, because large objects as well as small objects are removed, nor contrast-oriented).

The interest of the complexity criterion can be seen in segmentation-based coding applications. In such applications, one has often to decide if a specific area of the image has to be segmented or not. In the first case, the contours of the region are sent to the receiver and part of the coding cost is proportional to the length of the contour to code, that is the perimeter. In the second case, the area is considered as texture information, and its coding cost is generally proportional to its area. As can be seen, the complexity operator allows to classify the objects following a contour/texture cost criterion and may simplify the coding decision problem. The name "complexity" is assigned to the criterion because intuitively, it can be seen as already said that if a connected component has a small area but a very long perimeter, it corresponds to a complex object.

In the case of an entropy criterion, the basic idea consists in selecting the components only on the basis of the gray level distribution of the pixels inside their support. For each connected component, the histogram of the gray level values is computed and a specific characteristic is assessed on the histogram in order to decide if this connected component has to be preserved or removed. In the following, the example consists in measuring the entropy of the gray level distribution. The entropy measures from a statistical viewpoint the amount of information given by each connected component. Once the histogram of the pixels belonging to a connected component has been computed, the probability of each gray level value can be estimated. If $P_{C_h^k}(l)$ denotes the probability of occurrence of the gray level $l$ as estimated on the histogram of pixels belonging to the component $\hat{C}_h^k$, the entropy measured in bits is then defined thanks to the expression (1):

$$\text{Entropy}(C_h^k) = -\sum_l p_{C_h^k}(l) \cdot \log_2 p_{C_h^k}(l) \quad (1)$$

The entropy of an area of constant value is equal to zero, whereas the entropy is maximum for a random texture of uniform probability density function. For example, an entropy operator removes all components with entropy lower than 5 bits.

In the preferred case of a motion criterion, the basic idea is first to define an operator which will be able to remove image connected components that do not undergo a given motion. The first operation 3211 of the analysis sub-step 321 now consists in the definition of a motion model giving a displacement field $(D_i(i,j), D_j(i,j))$ for each pixel $(i,j)$. This field is constant $(D_i(i,j)=D_i$ and $D_j(i,j)=D_j$ whatever the values of i and j if one wants to extract all objects following a translation, but the displacement will generally depend on said spatial position $(i,j)$, in order to deal with more complex motion models such as affine or quadratic ones. The second operation 3212 is a sequence processing one, performed as follows. Each frame (consecutive frames are considered) is transformed into its corresponding max-tree representation, and each node $C_h^k$ is analyzed: to check whether or not the information contained in a given node $C_h^k$ is moving in accordance with the motion field $(D_i(i,j), D_j(i,j))$, it has been for instance choosen to consider the region created by the pixels of $C_h^k$ and to compute the opposite of the mean displaced frame difference (MDFD) of this region with the previous frame, which can be indicated by the expression (2):

$$\text{MDFD } (C_h^k)_{f_t}^{f_{t-1}} = \frac{-\Sigma_{i,j}|f_t(i,j) - f_{t-1}(i - D_i(i,j), j - D_j(i,j))|}{\Sigma_{i,j} 1} \quad (2)$$

with the following notations:
$f_t(i,j)$=image sequence (t=the time instant);
i,j=coordinate of the pixels of $C_h^k$.

The opposite of the mean displaced frame difference is used so that the criterion value for a region that has to be preserved is higher than the corresponding value when the region has to be removed.

This second operation 3212 can be generalized. It is indeed not very reliable, sometimes, to state on the motion of some part of an image on the basis of only two frames. It has then been decided to have a memory of some past decisions, which can be done by adding a recursive term. Two mean DFD are measured, a first one between the current frame $f_t$ and the previous frame $f_{t-1}$ and a second one between the current frame $f_t$ and a previous filtered frame called $\psi(f_{t-1})$, $\psi$ denoting the connected operator). The motion criterion is finally defined by the expression (3):

$$MOT \cdot (C_h^k) = \alpha \cdot MDFD(C_h^k)_{f_t}^{f_{t-1}} + (1-\alpha) \cdot MDFD(C_h^k)_{f_t}^{\psi f_{t-1}} \quad (3)$$

with $\alpha$ between 0 and 1. If $\alpha=1$, the criterion is memoryless (the expression (3) becomes the expression (2)), whereas on the contrary low values of $\alpha$ allow the introduction of a recursive component in the decision process. The selection of a pertinent value for $\alpha$ depends on the application: if one wants to detect very rapidly any change in motion, the criterion will be mainly memoryless, whereas the recursive part will be noticeable if a more reliable decision involving the observation of a larger number of frames is necessary.

An even more general operation may be provided, in which the parameter $\alpha$ is adapted for each frame by taking into account the operator effect on previous frames (at least on a previous one). The parameter is then given for instance by the expression (4):

$$\alpha_t = \alpha_0 \left(1 - \frac{\Sigma_{i,j}|f_t(i,j) - f_{t-1}(i - D_i(i,j), j - D_j(i,j))|}{\Sigma_{i,j}|f_t(i,j) - \psi(f_{t-1}(i - D_i(i,j), j - D_j(i,j)))|}\right) \quad (4)$$

with the restriction that $\alpha_t$ is comprised between 0 and a $\alpha_0$.

The motion criterion described by the expressions (2) and (3) deals with one set of motion parameters. Objects that do not follow exactly the given motion are removed. For some applications, it may be useful to preserve objects that are within a given range of motion (or motion bandwidth). To this end, the criterion corresponding to the expression (2) can be modified by introducing an erosion $\epsilon$ and a dilation $\delta$ of the previous frame. The difference $|f_t - F_{t-1}|$ in the mean displaced frame difference MDFD is replaced at each point (i,j) either by $f_t - \delta$ ($f_{t-1}$) if $f_t > \delta(f_{t-1})$, by $\epsilon(f_{t-1}) - f_t$, if $f_t < \epsilon(f_{t-1})$, or by 0 if $\delta(f_{t-1}) \leq f_t \leq \epsilon(f_{t-1})$. This approach is illustrated in FIGS. 5 and 6, illustrating the implementation of the motion criterion for one motion parameter and for a range of motion respectively. As can be seen, the erosion and the dilation of $f_{t-1}$ create a "tube" in which the function $f_t$ can remain without contributing to the displaced frame difference. The size of the structuring element used in the dilation and the erosion defines the motion bandwidth.

The decision sub-step 322 is provided in order to state on the preservation or the elimination of each node $C_h^k$, by means of a binary decision. If one assumes that a decision cost is assigned to each possible decision for each node, the decision problem can be seen as finding the set of lowest cost paths that go from the leaves of the tree down to the root node. This approach is described in detail in the case of a simple tree involving a single branch. As shown in FIG. 7, first one assigns to each node $C_h^k$ of the max-tree two states, $P_h$ and $R_h$, describing the two possible decisions: "preserve" or "remove". Second, a trellis is constructed by creating transitions linking the possible decisions of one node and of its father. Between $C_h^k$ and $C_{h-1}^k$, there are four possible transitions: $R_h \rightarrow R_{h-1}$, $R_h \rightarrow P_{h-1}$, $P_h \rightarrow R_{h-1}$ and $P_h \rightarrow P_{h-1}$. Furthermore, a cost is assigned to each transition. The same cost is assigned to the two transitions going to a "preserve" state. This cost should reflect the reliability of the "preserve" decision for that node (this reliability may be measured for example by the difference between the given limit $\lambda$ of the criterion and the criterion value $M(C_h)$: if the reliability is very high, the cost is very low). In the case of a transition emanating from a "remove" state and going to a "remove" state, the situation is similar and the value $M(C_h)-\lambda$ can be assigned as transition cost. This is however not the case for the transition emanating from a "preserve" state and coming to a "remove" state. Indeed, these transitions should be avoided because one wants to define a level h above which all nodes are removed and below which all nodes are preserved, which can be made if an infinite cost is assigned to them. Now, the decision consists in finding in this trellis, the path of lowest cost that starts from the maximum and ends in the "preserve" state of the root node (at least, the root node should be preserved). The cost of a path is defined as the sum of the costs of its transitions.

This problem can be very efficiently solved by the well-known Viterbi algorithm, the main aspects of which are recalled. Assume that the two optimum (lowest cost) paths starting from the maximum and ending at $P_{h+1}$ and $R_{h+1}$, are known: one calls $Path_{h+1}^P$ and $Path_{h+1}^R$ these two optimum paths. The definition of the two optimum paths ending at $P_h$ and $R_h$ can be defined by a local decision. For example the optimum path ending in $R_h$, that is $Path_h^R$, is defined by the rule (5):

If $Cost(Path_{h+1}^P) + Cost(P_{h+1} \rightarrow R_h) \leq Cost(Path_{h+1}^R) +$ (5)

$Cost(R_{h+1} \rightarrow R_h)$ then $(Path_h^R) = (Path_{h+1}^P) U\{P_{h+1} \rightarrow R_h\}$ else $(Path_h^R) = (Path_{h+1}^R) U\{R_{h+1} \rightarrow R_h\}$ This rule simply states that the optimum path ending at state $R_h$ has to go through either state $R_{h+1}$ or state $P_{h+1}$ and that the best path is the one leading to the lowest additive cost. A similar decision rule can be defined for the best path ending at state $P_h$. This process is iterated until the root node h=0 and the optimum path is progressively constructed on the basis of local decisions. Finally, once the optimum path is found, the states it goes through define the decisions for each node.

This rather simple procedure has to be extended to deal with trees with various branches: FIG. 8 corresponds to the case of the junction of two branches but the procedure is general and this extension concerns an arbitrary number of branches. The case of the state $R_h$ will for instance be analyzed: there is not one but two optimum paths ending at this state. One path comes from branch 1 whereas another one comes from branch 2 (they are independent from each other). As a result, one has to define independently these two paths. In FIG. 8, two sets of transitions, identified by solid and dotted lines, can be seen. The decision defined by the rule (5) previously given (concerning the definition of the optimum path) is used on both sets of transitions. Once these two optimum paths have been defined, their union is considered as "the optimum path" ending at state $R_h$ and its cost is equal to the sum of the costs of two paths.

The interest of this decision method relies on the fact that it is very robust. In practice, the robustness means that similar input images lead to similar output results. This advantage is obtained because the decision is global on the entire tree and not local. The robustness of the Viterbi approach is also reflected by the fact that decisions do no strongly depend on the cost assigned to each transition (for example, in practice, similar results are obtained if the costs proposed previously are replaced by their sign: either 1 or −1).

The decision sub-step 322 has created a filtered max-tree by removing some nodes on the basis of a cost criterion. Each time a node is removed, its pixels are merged with the pixels of the father node. The third step 33 consists in computing the output images. This step generally consists in assigning to a pixel (i,j) the gray level value h of the node $C_h^k$ it belongs to. This rule may however be modified for specific applications. It has been seen that the decision classifies the nodes, and their corresponding pixels, into two classes: nodes to be removed and nodes to be preserved. A different restitution technique can then be assigned to each class. If a node has to be preserved, its content will not be modified by the connected operator. As a result, the original gray level values are used for the pixels of preserved nodes. By contrast, nodes to be removed correspond to areas that should disappear from the image. One approach consists in estimating the gray level values that would be seen if this area was actually not present in the image. In the sequel, three examples are described. The first one involves a classical area opening followed by a max-tree creation according to the nonflat binarization approach (adapted binarization rule previously described in relation with the binarization sub-step 311, with for example $\Delta$=8). An area opening is applied on the max-tree and a decision is taken for each node. In the resulting decision map, dark (bright) areas represent nodes to be preserved (removed). The final result is an image where pixels to be preserved are equal to their original values and pixels to be removed are set to the values they have using the flat approach. In this example, the result of this flat approach is used as an estimate of the image gray level values behind the areas to be removed.

A second solution should be to compute the mean of the pixels of the areas to be removed. However, in practice, this approach may give results where the transitions between removed and preserved nodes are very visible. The third solution may be a sequence filtering with a motion-oriented connected operator. The objective is to preserve all image components that do not move. With the example of a fixed scene showing a corridor with a person walking, by using in cascade the motion operator followed by its dual, the final filtered image is such that the person has been removed and replaced by flat zones of the background. As one deals with a time sequence, information of what is behind this person can moreover be extracted from previous frames, according to the following rule: if the pixel belongs to a node to be removed, the output gray level value can be defined by motion compensation of the previous filtered frame (for a pixel (i,j), the output gray level value $g_t(i,j)$ is given by $g_t(i,j)=g_{t-1}(i-\Delta_i, j-\Delta_j)$).

As already said, the invention also relates to a filtering system for carrying out the described filtering method. The filtering system, illustrated in FIG. 4, comprises in cascade a classification device 41, a filtering device 42 and a restitution device 43.

Figure 1:
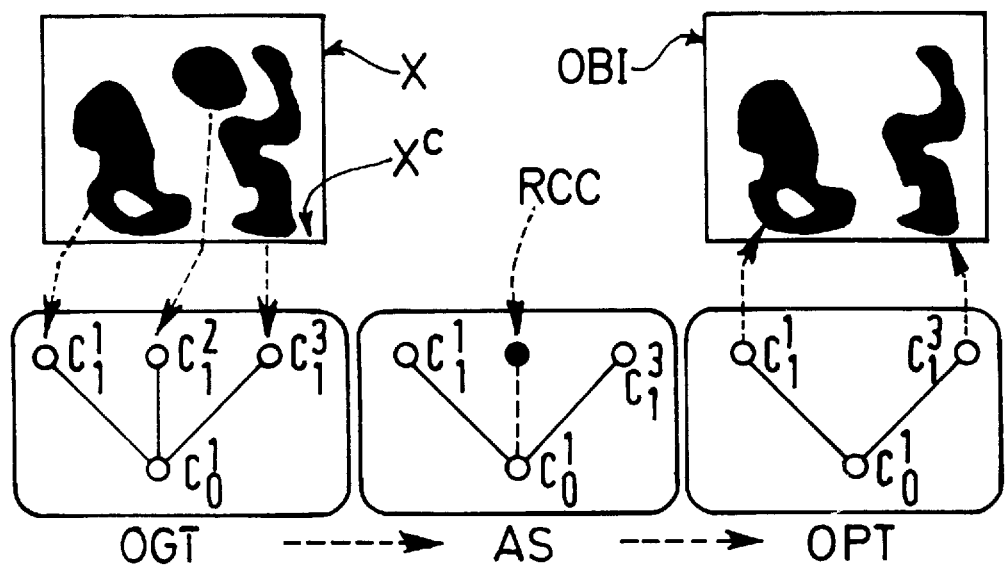
FIG. 1 illustrates how a connected operator works in case of binary images.

The classification device 41 comprises a max-tree creation stage 411, and may be followed by a correction stage 412 provided for eleminating small holes that are possibly present in the connected components. Said stage 411 comprises a first definition circuit 4111, provided for defining the particular binarization criterion, for instance in this case for the definition of thresholds corresponding to some gray levels of the image. This circuit 4111 is followed by n parallel binarization circuits 4112A, 4112B, . . . , 411N allowing to create successive thresholded versions of the image according to these gray levels, and a reconstruction circuit 4113 receiving the outputs of the binarization circuits allows to reconstruct an approximation of the gray level function (the function of this reconstruction circuit corresponds to the creation of the output binary image OBI in the case of the approach described with reference to FIG. 1). The correction stage 412 comprises, if provided, a circuit (4121, 4122) for implementing the conventional watershed method, in which the distance function is now computed by a computation device 4121 no longer for the binary set X resulting from the previous local background complement definition but for a filtered version of it, said computation being followed by the computation, in a computation device 4122, of the opposite of said function distance.

The filtering device 42 comprises an analysis stage 421, including a definition circuit 4211 that allows to define an operator removing the connected components which do not satisfy a predetermined criterion, for example a complexity criterion or a motion criterion, and a decision stage 4221, that allows to remove some nodes or to preserve them according to the rule defined by said criterion.

The tests that have been conducted show the efficiency of the proposed filtering method. For instance, in the case of a motion connected operator, some examples are illustrated in FIGS. 9 to 16.

Figure 12:
Figure 13:

A first motion filtering example is shown in FIGS. 9, 11, 12 and 13 that correspond to an example of motion connected operator preserving fixed objects. The objective of the operator is to remove from the original image of FIG. 9 all moving objects. The motion model is defined by: ($\Delta_i$, $\Delta_j$)=(0,0). In this sequence, all objects are still except the ballerina behind the two speakers and the speaker on the left side who is speaking. The application of the motion connected operator $\psi$ (f) described previously removes all bright moving objects (FIG. 11), and the application of its dual operator removes all dark moving objects (FIG. 12). The residue (that is the difference with the original image) is then presented in FIG. 13 and shows what has been removed by the motion operator. As can be seen, the operator has very precisely extracted the ballerina and the moving details of the speaker's face.

Figure 10:
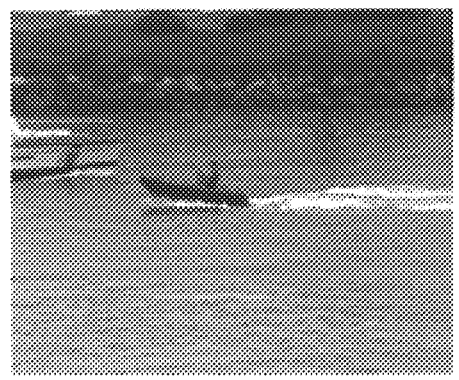
Figure 11:
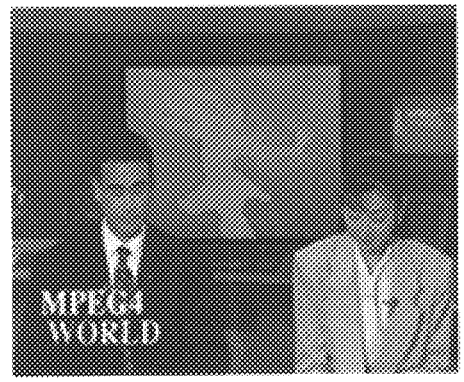
Figure 14:
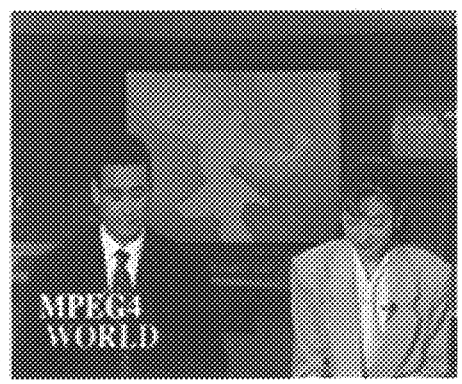
Figure 15:
Figure 16:

A second example is illustrated in relation with the original image of FIG. 10 and associated FIGS. 14 to 16, that correspond to an example of motion-oriented decomposition. A decomposition of this original image is obtained into three steps. First the dominant translation is estimated giving the following motion model ($\Delta_i$, $\Delta_j$)=(2,0). Objects following this translation are obtained by application of the motion operator followed by its dual operator (FIG. 14). Then, the difference between the original frame and the filtered frame is computed and on this residue still objects ($\Delta_i$, $\Delta_j$)=(0,0) are extracted (FIG. 15). Finally, the remaining components are shown in FIG. 16. This is a decomposition of the original sequence in the sense that the sum of the three sequences restores the original sequence. As can be seen, the filtering has clearly separated the background and the two boats moving in two different directions.

We claim:

1. A method of filtering a sequence of images, comprising for each considered image:

(A) a classification step, including parallel binarizations of the image for some of the gray levels of its picture elements, said binarizations being provided for defining a local background and, after an analysis of the background complement, corresponding successive connected components constituting together a tree structure made of a father node and successive child nodes and called a max-tree representation of the concerned image, and being followed by a reconstitution of an approximation of the gray level function of said image;

(B) a filtering step, provided for taking a decision on the elimination or the preservation of the nodes of the tree according to a specified filtering criterion, the picture elements of any eliminated node being assigned to its father node;

(C) an image restitution step, provided for assigning to each picture element of the image a gray level value.

2. A method according to claim 1, in which:

(A) the classification step comprises the following sub-steps:
  (1) a binarization sub-step, comprising the following operations:
    (a) a definition of the binarization criterion;
    (b) n parallel binarizations of the image, the first one resulting in the definition of the local background and the (n−1) other ones resulting in the definition of the corresponding successive connected components;
    (c) said reconstitution of an approximation of the gray level function of the image;

(B) the filtering step comprises the following sub-steps:
  (3) an analysis sub-step, provided for defining and measuring a filtering criterion;
  (4) a decision sub-step, provided for taking the decision on the elimination or the preservation of the nodes;

(C) the image restitution step comprises the following sub-step:
  (5) a computing sub-step, provided for assigning to each picture element of the image the gray level value of the node it belongs to.

3. A method according to claim 2, in which the binarization operations leading to the definition of the connected components are carried out by the use of a watershed method, including first the computation of a so-called distance function DIST(X) of the binary set X resulting from the previous local background complement definition and then the computation of the watershed of (-DIST(X)).

4. A method according to claim 2, in which the classification step also comprises, after said binarization sub-step:

(2) a correction sub-step, in which the binarization operations leading to the definition of the connected components are carried out by the use of a watershed method, including first the computation of a so-called distance function DIST(X) of a filtered version of the binary set X resulting from the previous background complement definition and then the computation of the watershed of (-DIST(X)).

5. A method according to claim 2, in which, for a simple tree involving a single branch, said decision sub-step itself comprises:

(a) a first assignation operation, provided for assigning to each node $C_h^k$ of the max-tree representation two states $P_h$ and $R_h$ corresponding to the two possible decisions "preserve" and "remove";

(b) a second construction operation, provided for creating a trellis that comprises transitions linking the possible decisions of one node $C_h^k$ and of its father $C_{h-1}^k$, said transitions being called $R_h \rightarrow R_{h-1}$, $R_h \rightarrow P_{h-1}$, $P_h \rightarrow R_{h-1}$ and $P_h \rightarrow P_{h-1}$;

(c) a third cost assignation operation, said cost reflecting the reliability of each decision for each node, and the global cost of a path being defined as the sum of the costs of its transitions;

(d) a fourth local decision operation, provided for selecting the optimum paths ending at $P_h$ and $R_h$ thanks to a criterion of selection of a rule leading to the determination of a lowest additive cost;

(e) a fifth global decision operation, provided for defining the definitive decision for each node on the basis of the states associated to the selected optimum path.

6. A method according to claim 2, in which, for a tree involving several branches, said decision sub-step itself comprises, within each branch:

(a) a first assignation operation, provided for assigning to each node $C_h^k$ of the max-tree representation two states $P_h$ and $R_h$ corresponding to the two possible decisions "preserve" and "remove";

(b) a second construction operation, provided for creating a trellis that comprises transitions linking the possible decisions of one node $C_h^k$ and of its father $C_{h-1}^k$, said transitions being called $R_h \rightarrow R_{h-1}$, $R_h \rightarrow P_{h-1}$, $P_h \rightarrow R_{h-1}$ and $P_h \rightarrow P_{h-1}$;

(c) a third cost assignation operation, said cost reflecting the reliability of each decision for each node, and the global cost of a path being defined as the sum of the costs of its transitions;

(d) a fourth local decision operation, provided for selecting the optimum paths ending at $P_h$ and $R_h$ thanks to a criterion of selection of a rule leading to the determination of a lowest additive cost;

said four operations being followed, after their implementation successively for each branch, by an additional global decision operation, provided for first defining a global optimum path as the union of said respective optimum paths and an associated global cost equal to the sum of the respective costs of these optimum paths, and then defining the definitive decision for each node on the basis of the states associated to the defined global optimum path.

7. A system for filtering a sequence of images, comprising:

(A) a classification device, itself comprising:
    (1) a max-tree creation stage, said stage including in series:
        (a) a circuit for the definition of a binarization criterion;
        (b) n parallel binarization circuits generating, according to said binarization criterion, simplified versions of the considered original image in the form of a local background and of associated connected components constituting a tree structure made of a father node and successive child nodes and called a max-tree representation of said considered original image;
        (c) a reconstruction circuit generating an approximation of the gray level function of said considered original image;

(B) a filtering device, itself comprising:
    (3) an analysis stage, provided for analyzing each node of said max-tree according to a specific filtering criterion;
    (4) a decision stage, provided for eliminating or preserving nodes of said max-tree on the basis of said filtering criterion and, each time a node is eliminated, for merging its picture elements with those of its father node;

(C) an image restitution device, provided for computing the output images by assigning to each of its picture elements the gray level value of the node it belongs to.

8. A system according to claim 7, in which the classification device also comprises, in series with said max-tree creation stage:

(2) a correction stage, including in series:
    (d) a device for the computation of the function distance of a filtered version of a binary set resulting from a background complement definition;
    (e) a device for the computation of the watershed of the opposite of said function distance.

9. A system according to claim 7, in which said specific filtering criterion is a complexity one, said analysis stage then comprising a circuit for measuring for each connected component the ratio between its perimeter and its area and said decision stage comprising means for eliminating the nodes that have a long perimeter and a small area and merging the picture elements of each eliminated node to those of its father node.

10. A system according to claim 7, in which said specific filtering criterion is an entropy one, said analysis stage then comprising a measuring operation, provided for defining, after a computation of the histogram of the pixels belonging to a connected component, the amount of information given by each connected component, and said decision stage then comprising a decision operation, provided for removing all components with entropy lower than a predetermined value.

11. A system according to claim 7, in which said specific filtering criterion is a motion one, said analysis stage then comprising a circuit for the definition of a motion model giving a displacement field $(D_i(i,j), D_j(i,j))$ for each picture element $(i,j)$ of the considered original image and said decision stage comprising means for eliminating or preserving the nodes according to a parameter related to said motion model.

12. A system according to claim 11, in which said parameter is the mean displaced frame difference between the concerned region and the previous frame, said difference being greater for a region that has to be preserved than for a region that has to be removed.

13. A system according to claim 12, in which said parameter is a weighted sum of mean displaced frame differences.

14. A system according to claim 12, in which said parameter is adapted for each frame by taking into account the similar operator effect on at least a previous frame.

* * * * *